Sept. 27, 1932.  C. C. BOYKIN  1,879,055
SEED PLANTING MACHINE
Filed May 31, 1930   3 Sheets-Sheet 1
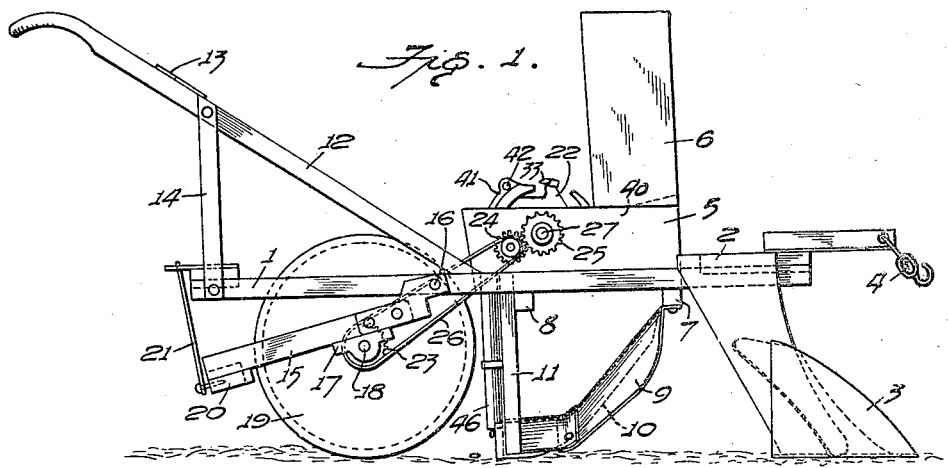
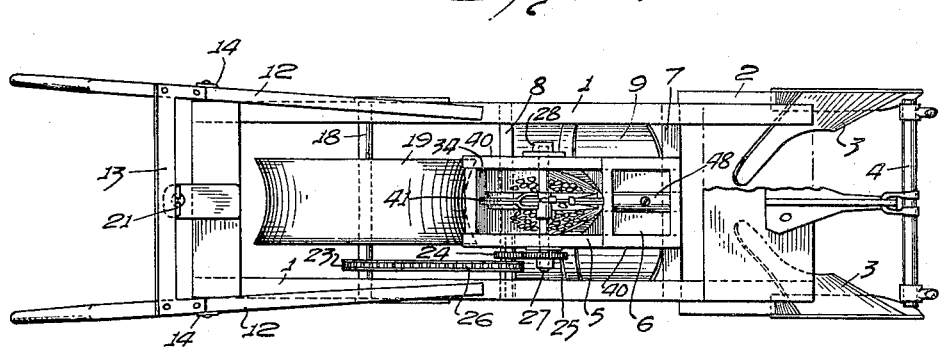
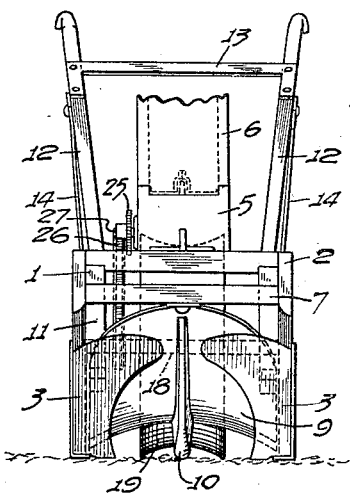
INVENTOR
Christopher C. Boykin
BY
ATTORNEY Sept. 27, 1932.                C. C. BOYKIN                1,879,055
                            SEED PLANTING MACHINE
                    Filed May 31, 1930          3 Sheets-Sheet 2

INVENTOR
Christopher C. Boykin
BY
ATTORNEY

Sept. 27, 1932.  C. C. BOYKIN  1,879,055
SEED PLANTING MACHINE
Filed May 31, 1930   3 Sheets-Sheet 3
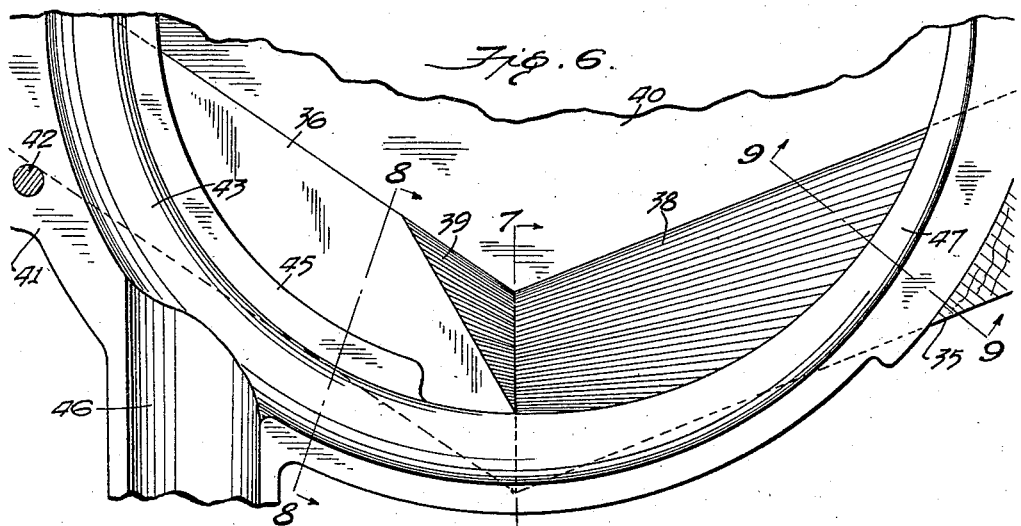
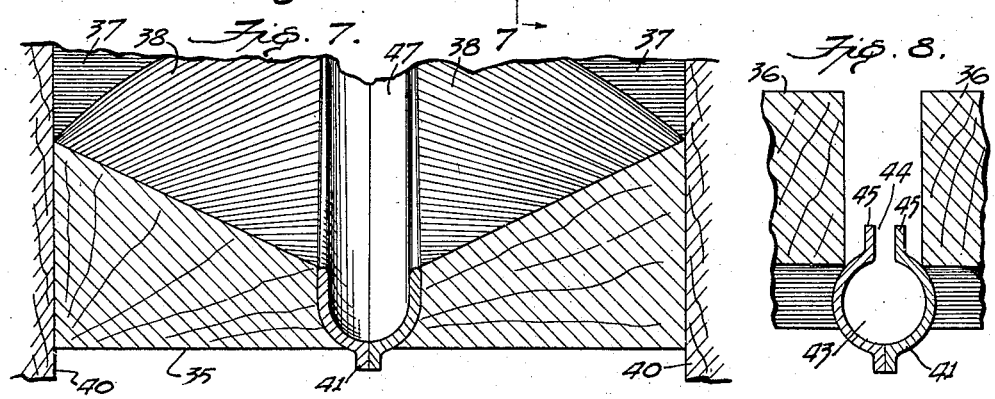
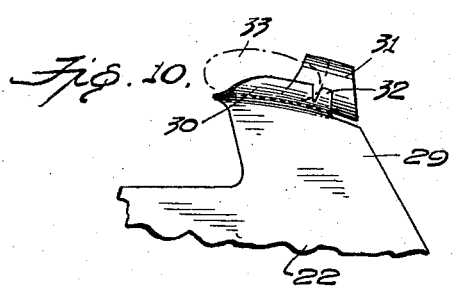
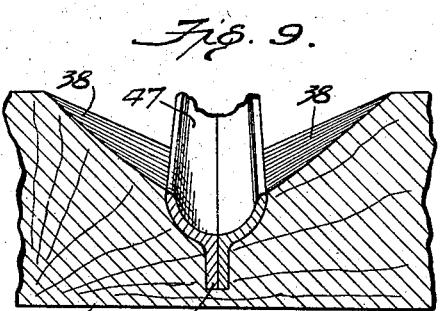
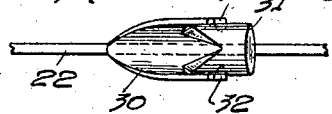
INVENTOR
Christopher C. Boykin
BY
ATTORNEY Patented Sept. 27, 1932

1,879,055

UNITED STATES PATENT OFFICE

CHRISTOPHER C. BOYKIN, OF NORFOLK, VIRGINIA

SEED PLANTING MACHINE

Application filed May 31, 1930. Serial No. 458,359.

This invention relates to planting machines of the type known as seed planters, and particularly of the class wherein a rotary seed dropping mechanism is operatively connected with the mobile means and its speed of rotation is a function of the linear velocity of the entire machine.

More specifically, my invention concerns a peanut planter which has a novel seed dropping mechanism comprising a feed wheel and associated casing constructed and arranged so that peanuts are dropped continuously and uniformly one at a time without missing. Further features of my improved planter comprise a plow with duplex coacting blades, plate means for smoothing off the ridge and gauging the planting depth, means on the plate means for opening a furrow, and self-adjusting floating pressing roller means adapted to cover the seed at a rate proportionate to the rate of feed of the dropping wheel.

In the prior art, a number of seed planters have been proposed for planting peanuts by operation of a feed wheel rotatably actuated by gearing connected with the axle or other moving part of the planting vehicle. These prior proposals have made use of burdensome and expensive devices for conveying the seed from hopper to feed wheel and ground, or for complex mechanical arrangements for gearing the various moving parts, so that high manufacturing costs of assembly and repair were a result, together with frequent disabling of the machine, causing loss of time and money. Furthermore, the greatest difficulties attendant upon the prior proposals have been the troubles connected with the feed-dropping devices. These devices have either jammed in operation or have failed to distribute the seeds in a uniform line because of frequent missing, due to some defect of the dropping mechanism, and particularly the arrangement of feed wheel and associated casing. In the prior art, the feed wheel devices have been designed with toothed or pocket members to "pick up" the nut or seed, and herein lay the evils of crushing of the seed, jamming of the passages and inaccuracies of planting.

I have discovered that the disadvantages of the feeding devices of the prior art may be obviated by constructing the nut receiving members of the feed wheel so that the nut is "pushed" into receiving position, as distinguished from being "picked up."

I have also constructed my device to comprise a relatively small number of parts, which enhances the simplicity of manufacture and lowers the cost of purchase and operation.

Referring to the drawings;

Figure 1 is view in side elevation of my improved planter,

Figure 2 is a plan view,

Figure 3 is a view in front elevation,

Figure 4:
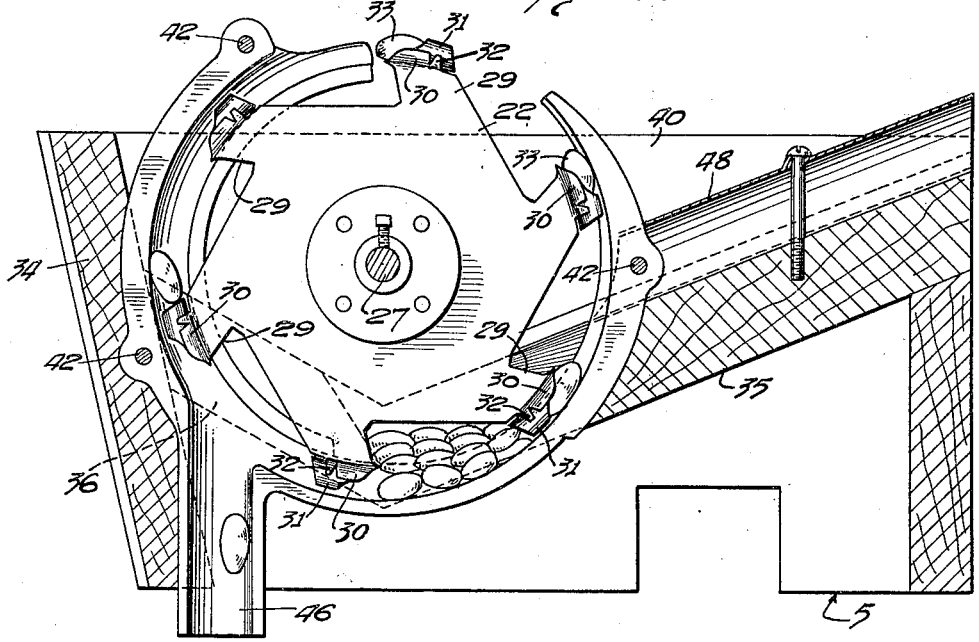
Figure 5:
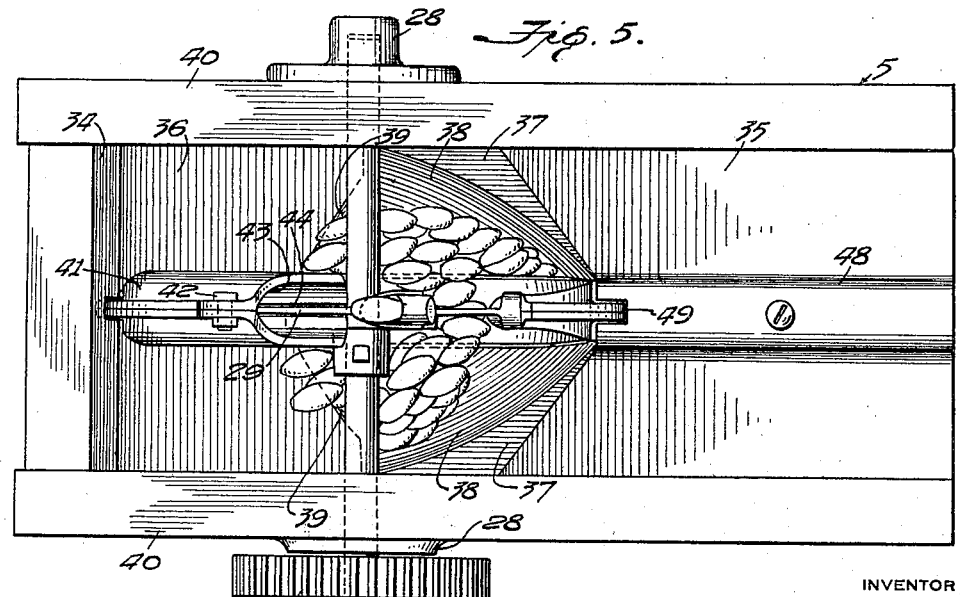

Figure 4 is a view partly in cross-section showing the arrangement of feed wheel and associated casing, Figure 5 is a plan view of the structure shown in Figure 4, Figure 6 is a sectional view of the casing which partly surrounds the feed wheel, showing the angular cut-out construction of the hopper bottom, Figure 7 is a section taken on line 7—7 of Figure 6, Figure 8 is a section taken on line 8—8 of Figure 6, Figure 9 is a section taken on line 9—9 of Figure 6, Figure 10 is a view in elevation of one of the pushing nut-receiving members mounted on one of the teeth of the feed wheel, Figure 11 is a plan view of the nut-receiving member shown in Figure 10.

Referring to Figures 1, 2 and 3, my machine comprises a frame 1 having mounted thereon at its front end the plow supporting member 2 carrying the plows 3, above which a horizontal hitching bar 4 is secured by bracket members. Rearwardly of the plows, the hopper 5 and chute 6 rest on cross bars 7 and 8 which extend transversely of the frame. Secured to the bar 7 and depending therefrom is the curved ridge-smoothing plate 9 having attached thereto the furrow opener 10 of which the rear end is supported by a member 11 depending from the frame 1. Rearwardly of the hopper 5, frame handles 12 joined by cross-bar 13 are supported by standards 14 on the frame. A pair of bars 15 are pivoted adjacent their upper ends to the longitudinal members of the frame 1 rearwardly of the hopper 5 and the rear ends of said bars are connected by a cross bar 20. A rod 21, of which the lower end is pivotally attached to the cross bar 20 between the ends of the latter, is slidable through an opening in a plate carried by the rear cross member of the frame 1. Each of the bars 15 carries between its ends a bearing member 17 for a shaft 18 and a pressing roller 19 is keyed to said shaft behind the furrow opener 10. Thus the presser wheel 19 will straddle and close a furrow formed by the furrow opener 10 if peanuts or other seed are fed to such furrow and is free to rise and fall relatively to the frame 1 according to the depth to which the furrow opener may penetrate the ground.

Movement of the presser wheel 19 over the ground imparts rotation to a feeder wheel 22 in the hopper 5 through a sprocket wheel 23 on the shaft 18, a sprocket wheel 24 journalled on a side wall of the hopper 5, a chain 26 passing over the sprocket wheels 23 and 24, and a gear carried by the sprocket wheel 24 which meshes with a gear wheel 25 on the end of a shaft 27 extending transversely of the hopper 5 and carrying the feeder wheel 22. The shaft 27 is journalled in bearings 28 carried by the side walls 40 of the hopper 5.

The feed wheel 22 comprises a thin disc having projections 29 on its periphery. Each projection 29 carries a pushing nut receiver composed of scoop 30 and retainer 31. The retainer 31 is effectively secured to the scoop 30 by means of clamps 32 struck out of the scoop. As shown in Figures 10 and 11, the scoop may be of two parts and formed of metal and the retainer may be of wood, the shape of both members being such that a nut 33 is adapted to lie snugly therein.

The hopper 5, which receives the peanuts or other seed from a chute 6 mounted above the same, comprises a pair of vertical side walls 40, a rear end wall 34, bottom walls 35 and 36 which slant toward the transverse center of the hopper, and bottom members 36 and 37 which slant toward the longitudinal center of the hopper.

The bottom members 36 and 37 are hollowed out adjacent their lower ends, as at 38 and 39, and a slot is formed at the center of the lower edge of the bottom member 36 and between the abutting lower edges of the bottom members 37, in which slot a casing 41 formed of a pair of complemental circular sections is seated. The two sections of the casing 41 are secured together by bolts 42 which pass through circumferential flanges on said parts.

The casing 41 comprises an arcuate tubular portion 43, concentric with the shaft 18 and an arcuate channel-shaped portion, also concentric with the shaft 18 and forming a continuation of the tubular portion 43. A slot 44 is formed in the inner periphery of the tubular portion 43 by a pair of flanges 45 on the inner peripheries of the sections which form the casing. During the rotation of the feed wheel 22 its projections 29 successively move through the slot 44. The tubular portion 43 also has a discharge tube 46 extending tangentially therefrom adjacent its lower end.

The upper edges of the side walls of the channel-shaped portion 47 are flush with the hollowed-out portions 38 and 39 of the bottom members 36 and 37 adjacent the point where the channel-shaped portion 47 joins the tubular portion 43, and said side walls taper toward their opposite ends. The channel-shaped portion 47 terminates above and at one side of the shaft 18 at a distance from the upper end of the tubular portion 43.

The side walls 40 of the hopper 5 are equidistantly spaced from the casing 41, and a bead 48, preferably of tubular form and of the same thickness as the casing 41, as shown in Figure 4, extends lengthwise of the bottom member 35 in longitudinal alignment with the casing 41. This bead serves to direct the peanuts or other seed which fall from the chute 6 upon the forward portion of the bottom member 35 to opposite sides of the casing 41 and into the channel-shaped member 47 at the bottom of the hopper.

The operation of the planter is as follows:

The plows 3 form a ridge on which to plant the seed. The plate 9 smooths off the ridge and the member 10 opens a furrow. The peanuts are dropped one at a time thru the chute 46 and the concave-faced pressing roller 19 covers and presses the dirt over the seed. By reason of the pivoted linkage attachment of the pressing roller to the frame, it is self-adjusting or floating. The gearing between the axle of the roller 19 and journal 27 causes the rotation of the feed wheel 22 in accordance with the rotation of the roller 19.

The operation of the feeding device is as follows:

Peanuts which are dropped into chute 6 strike the partition 48, are diverted to both sides of the same and fall into the sloping angular shaped bottom of the hopper. Since the open tapered groove of the casing 41 lies below the level of this bottom, the seeds gravitate into the groove. The nut pushing receiver element rotates in this groove and coacts with the same to form a closure defined by scoop element 30, retainer 31 and wall of groove 47. The rotation of disc 22 causes the pushing receiver to push the nut along the groove until the open top end of the grooved casing is reached. In this position, the nut rests without additional support within the scoop 30. Further rotation causes the nut to drop by gravity in the annular tube 43 down the chute 46.

Thus it will be seen that the open scoop and the grooved casing together form a complete cylinder or cup for holding the nut; half of this cylinder, or the scoop, is moving while the other half, or the casing groove, is stationary. It will also be seen that the grooved casing tends to line up the nuts with their ends pointing toward the open end of the moving scoop. The open portion of the scoop passes over the nut lying in the groove without attempting to lift the nut in a cup, but slides the nut along in the casing without lifting it until it passes the upper end of the casing where the nut lies in the scoop by its own gravitational attraction.

Having described my invention in accordance with the provisions of the statutes, I wish to claim the same as broadly as possible except as to the limitations imposed by the prior art.

I claim:

1. A peanut planting machine, comprising a hopper of which the bottom slopes toward the longitudinal center of same, a shaft extending transversely of said hopper, a casing mounted in and extending longitudinally of said hopper, said casing comprising an arcuate tubular portion concentric with and disposed on one side of said shaft and an arcuate channel-shaped portion forming a continuation of said tubular portion on the opposite side of and concentric with said shaft, said tubular portion having a slot in its inner periphery and a discharge spout extending substantially tangentially therefrom adjacent its lower end, said channel-shaped portion having its lower end seated in the bottom of said hopper with its upper edges flush with the bottom thereof, a disc secured to said shaft and having projections adapted during the rotation of said shaft to successively enter the upper end and move longitudinally of the slot of the tubular portion of said casing, and a plurality of scoops carried, respectively, by said members and successively movable through the channel-shaped and tubular portions of said casing.

2. A peanut planting machine, comprising a hopper of which bottom members slope toward the longitudinal center of same, a casing mounted in and extending longitudinally of said hopper and spaced from the side walls of the latter, said casing comprising an arcuate tubular portion of which the lower end is disposed in the bottom of the hopper and an arcuate channel-shaped portion of the same radius as said tubular portion and forming a continuation of the latter, said tubular portion having a longitudinal slot in its inner periphery and a discharge spout extending substantially tangentially therefrom adjacent its lower end, the upper edges of the lower end of said channel-shaped portion being flush with the bottom of the hopper, a bead projecting upwardly from one bottom member of the hopper adjacent to and in longitudinal alignment with said casing, a disc rotatable in said hopper on an axis concentric with said casing and having a plurality of projections adapted to successively enter the upper end of said tubular portion and move longitudinally of said slot, and a plurality of scoops carried, respectively, by said projections and movable successively through the channel-shaped and tubular portions of said casing.

In testimony whereof I have hereunto set my hand.

CHRISTOPHER C. BOYKIN.